(12) United States Patent
Oh et al.

(10) Patent No.: US 10,974,587 B2
(45) Date of Patent: Apr. 13, 2021

(54) COOLING SYSTEM FOR VEHICLES

(71) Applicants: Hyundai Motor Company, Seoul (KR); Kia Motors Corporation, Seoul (KR)

(72) Inventors: Man Ju Oh, Gyeonggi-do (KR); Sang Shin Lee, Gyeonggi-do (KR); So Yoon Park, Gyeonggi-do (KR); Jae Woong Kim, Gyeonggi-do (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 66 days.

(21) Appl. No.: 16/286,101

(22) Filed: Feb. 26, 2019

(65) Prior Publication Data

US 2020/0156460 A1 May 21, 2020

(30) Foreign Application Priority Data

Nov. 16, 2018 (KR) .................. 10-2018-0141390

(51) Int. Cl.
*B60K 11/02* (2006.01)
*F28F 3/12* (2006.01)
*F28F 27/00* (2006.01)

(52) U.S. Cl.
CPC ................ *B60K 11/02* (2013.01); *F28F 3/12* (2013.01); *F28F 27/00* (2013.01); *F28F 2250/08* (2013.01)

(58) Field of Classification Search
CPC .... B60K 11/02; B60K 11/04; B60H 1/00278; B60H 1/00271; F28F 3/12; F28F 2250/08
See application file for complete search history.

(56) References Cited

U.S. PATENT DOCUMENTS 3,770,049 A * 11/1973 Wright ............... B60H 1/00271
165/41
2014/0069615 A1* 3/2014 Kusaka ................. H01L 23/473
165/104.19

FOREIGN PATENT DOCUMENTS

KR        101542993 B1      8/2015

* cited by examiner

*Primary Examiner* — Elizabeth J Martin
(74) *Attorney, Agent, or Firm* — Mintz Levin Cohn Ferris Glovsky and Popeo, P.C.; Peter F. Corless

(57) ABSTRACT

A cooling system for vehicles is provided. The cooling system includes a cooling channel disposed in a wheel housing of a vehicle and having an inlet port and an outlet port, and a cooling line that connects the inlet port and the outlet port of the cooling channel to a heat-emitting part of the vehicle to cool the heat-emitting part using the cooling channel. A cooling medium is introduced into the cooling channel through the inlet port, circulates through the cooling channel, and is discharged through the outlet port. One surface of the cooling channel is exposed toward the wheel of the vehicle to exchange heat with air swirling in a space formed between the wheel and the wheel housing.

14 Claims, 8 Drawing Sheets

1

COOLING SYSTEM FOR VEHICLES

CROSS-REFERENCE TO RELATED APPLICATION

This application claims the priority benefit of Korean Patent Application No. 10-2018-0141390, filed on Nov. 16, 2018, the disclosure of which is incorporated herein by reference.

BACKGROUND

1. Field of the Invention

The present invention relates to a system for cooling a cooling medium for vehicles, and more particularly to a cooling system for vehicles, which cools a cooling medium using heat exchange between air, swirling between a wheel and a wheel housing, and the cooling medium.

2. Description of the Related Art

In general, a vehicle is equipped with various heat-emitting parts including a battery, power electronic (PE) parts such as an inverter, and the like. These heat-emitting parts of a vehicle generally operate under harsh temperature conditions due to the heat generated during the driving of the vehicle and changes in external temperature. Thus, it is necessary to decrease the temperature of the heat-emitting parts using a cooling medium. After decreasing the temperature of the heat-emitting parts, a cooling medium circulates through a cooling line and is reduced in temperature.

Many conventional cooling systems for vehicles are configured to decrease the temperature of a cooling medium through heat exchange with air introduced through a radiator grille. However, a radiator grille installed to the front side of a vehicle causes substantial air resistance, which leads to deterioration in the aerodynamic performance of a vehicle. Therefore, there is the need for a novel cooling system for vehicles, which is capable of decreasing the temperature of a cooling medium using external air and improving the aerodynamic performance of a vehicle by minimizing air resistance acting thereon.

The information disclosed in this of the Invention section is merely for enhancement of understanding of the general background of the invention and should not be taken as an acknowledgement or any form of suggestion that this information forms the prior art already known to a person skilled in the art.

SUMMARY

Therefore, the present invention has been made in view of the above problems, and it is an object of the present invention to provide a system for cooling a cooling medium for vehicles, more particularly, a cooling system for vehicles, which cools a cooling medium using heat exchange between air, circulating between a wheel and a wheel housing, and the cooling medium.

In accordance with the present invention, the above and other objects may be accomplished by the provision of a cooling system for vehicles, including at least one cooling channel disposed in at least one wheel housing of a vehicle and including an inlet port and an outlet port, and a cooling line that connects the inlet port and the outlet port of the cooling channel to a heat-emitting part of the vehicle to cool the heat-emitting part using the cooling channel, wherein a cooling medium may be introduced into the cooling channel through the inlet port, may circulate through the cooling channel, and may be discharged through the outlet port, and wherein one surface of the cooling channel may be exposed toward a wheel of the vehicle to exchange heat with air swirling or circulating in a space formed between the wheel and the wheel housing.

A cooling medium introduction passage may be disposed within a cooling channel and the cooling channel may be connected to the inlet port and a cooling medium discharge passage connected to the outlet port, and the cooling medium introduction passage and the cooling medium discharge passage may be connected to each other inside the cooling channel.

The inlet port and the outlet port may be disposed adjacent to each other. The cooling medium introduction passage and the cooling medium discharge passage may be partitioned from each other by a partition wall in a first internal region formed near the inlet port and the outlet port, and may be connected to each other in a second internal region spaced apart from the inlet port and the outlet port.

The inlet port and the outlet port may be disposed at the middle portion of the cooling channel. The cooling medium introduction passage and the cooling medium discharge passage may be partitioned from each other by a partition wall that extends from the inner surface of the middle portion of the cooling channel in the first internal region formed near (e.g., proximate to) the inlet port and the outlet port.

The inlet port and the outlet port may be disposed at the end portion of a first side of the cooling channel. The interior of the cooling channel may be partitioned into the cooling medium introduction passage and the cooling medium discharge passage by a partition wall, and the cooling medium introduction passage and the cooling medium discharge passage may be connected to each other in an internal region formed near the end portion of the opposite side (e.g., a second side) of the cooling channel. The inlet port and the outlet port may be respectively disposed at the front side and the rear side of the wheel housing in the longitudinal direction of the vehicle, and the cooling medium introduction passage and the cooling medium discharge passage may be connected to each other inside the cooling channel.

The cooling system may further include a pump disposed in the cooling line. When the vehicle is being driven, the pump may be operated to cause the cooling medium to flow, and when the vehicle is stopped, the pump may be stopped to prevent the cooling medium from flowing. The first surface of the cooling channel exposed toward the wheel of the vehicle may be a heat dissipation plate made from a metal material.

The heat dissipation plate may include a plurality of flanges that protrude from the top surface thereof toward the interior of the cooling channel, and the flanges may be arranged to be spaced apart from each other. Additionally, the heat dissipation plate may include a plurality of heat dissipation fins that protrude from the bottom surface thereof toward the wheel of the vehicle, and the heat dissipation fins may be arranged to be spaced apart from each other. The heat dissipation plate may be fixedly inserted at the edge thereof into a groove formed along the inner peripheral surface of the cooling channel.

The at least one cooling channel may include a plurality of cooling channels, and the at least one wheel housing may include a plurality of wheel housings. Each of the cooling channels may be disposed in a respective one of the wheel housings. The cooling channels may be connected to each other via the cooling line.

Further, the at least one cooling channel may include four cooling channels, and the at least one wheel housing may include four wheel housings. The heat-emitting part may include a first part and a second part. The cooling medium discharged from the first part may be cooled while passing through two of the four cooling channels, and may be introduced into the second part. The cooling medium discharged from the second part may be cooled while passing through two remaining channels among the four cooling channels.

The at least one cooling channel may include two cooling channels, and the at least one wheel housing may include two wheel housings. The heat-emitting part may include a first part and a second part. The second part may emit heat at a greater temperature than the first part. The cooling medium discharged from the first part may be introduced into the second part, and the cooling medium discharged from the second part may be cooled while passing through the two cooling channels.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a cooling system for vehicles according to exemplary embodiments of the present invention will be described in detail with reference to the accompanying drawings.

Figure 1:
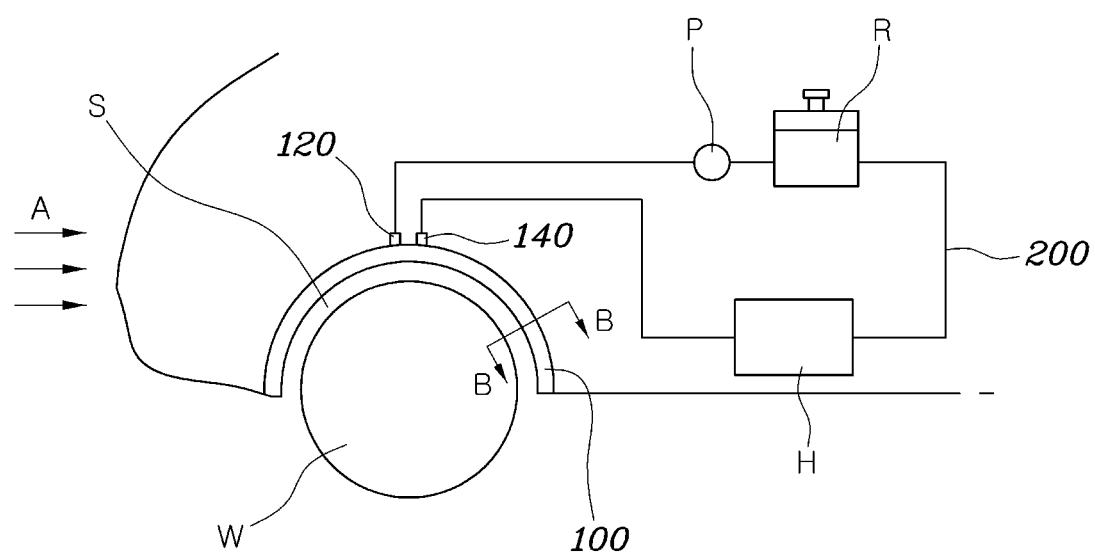
FIG. 1 is a view showing a cooling system for vehicles according to an exemplary embodiment of the present invention.
Figure 2:
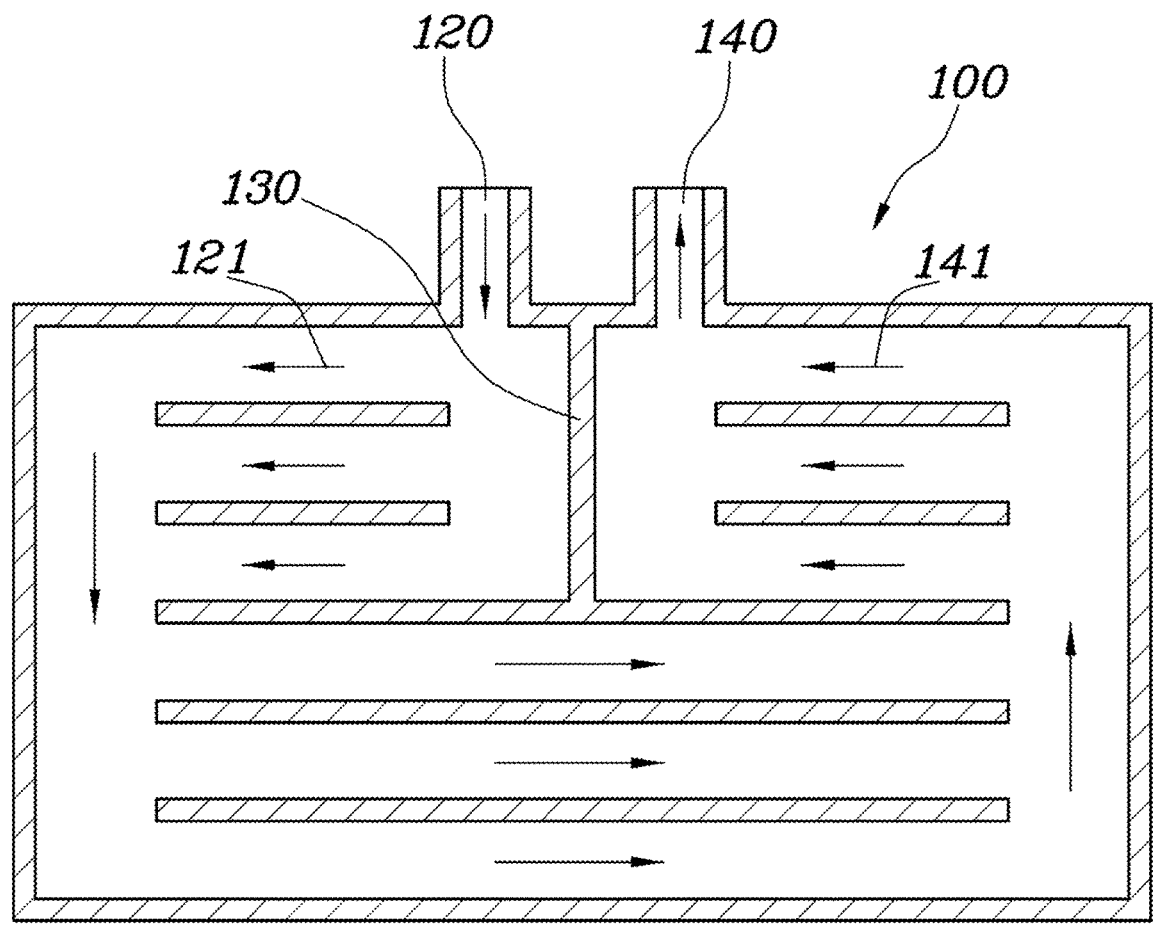
FIG. 2 is a view showing the internal structure of the cooling system for vehicles according to an exemplary embodiment of the present invention.
Figure 3:
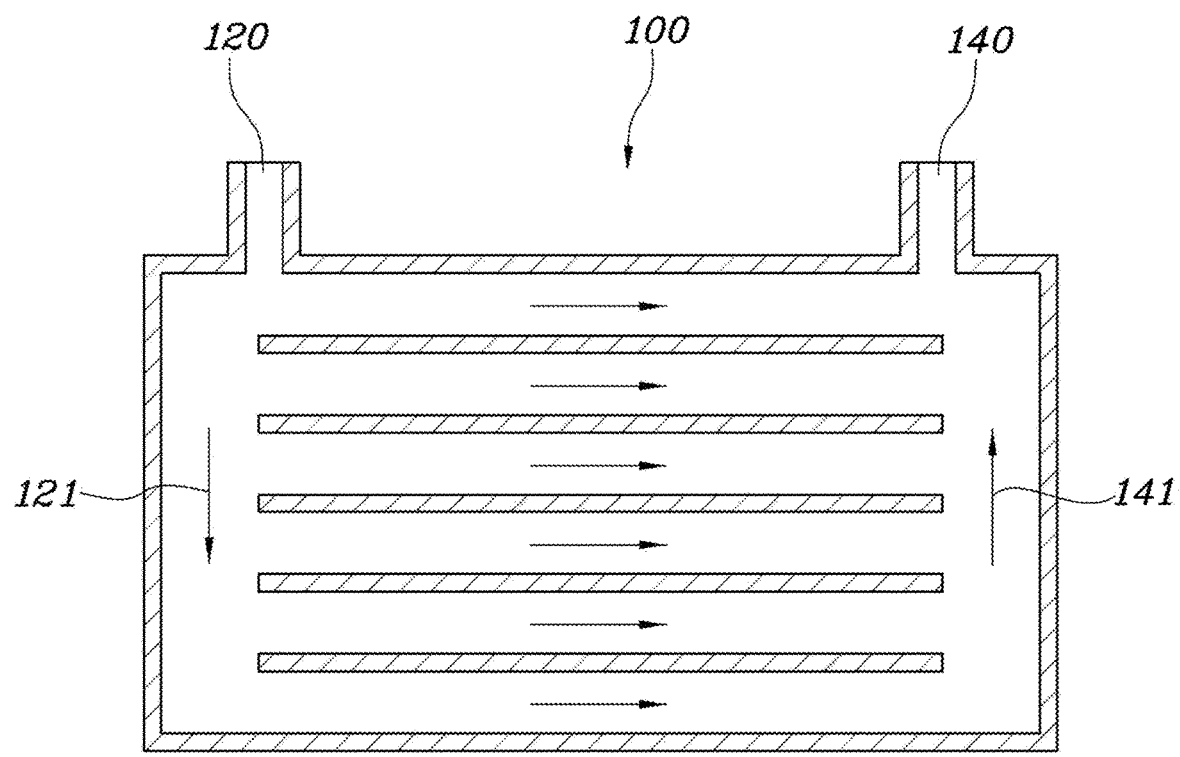
FIG. 3 is a view showing the internal structure of a cooling system for vehicles according to another exemplary embodiment of the present invention.
Figure 4:
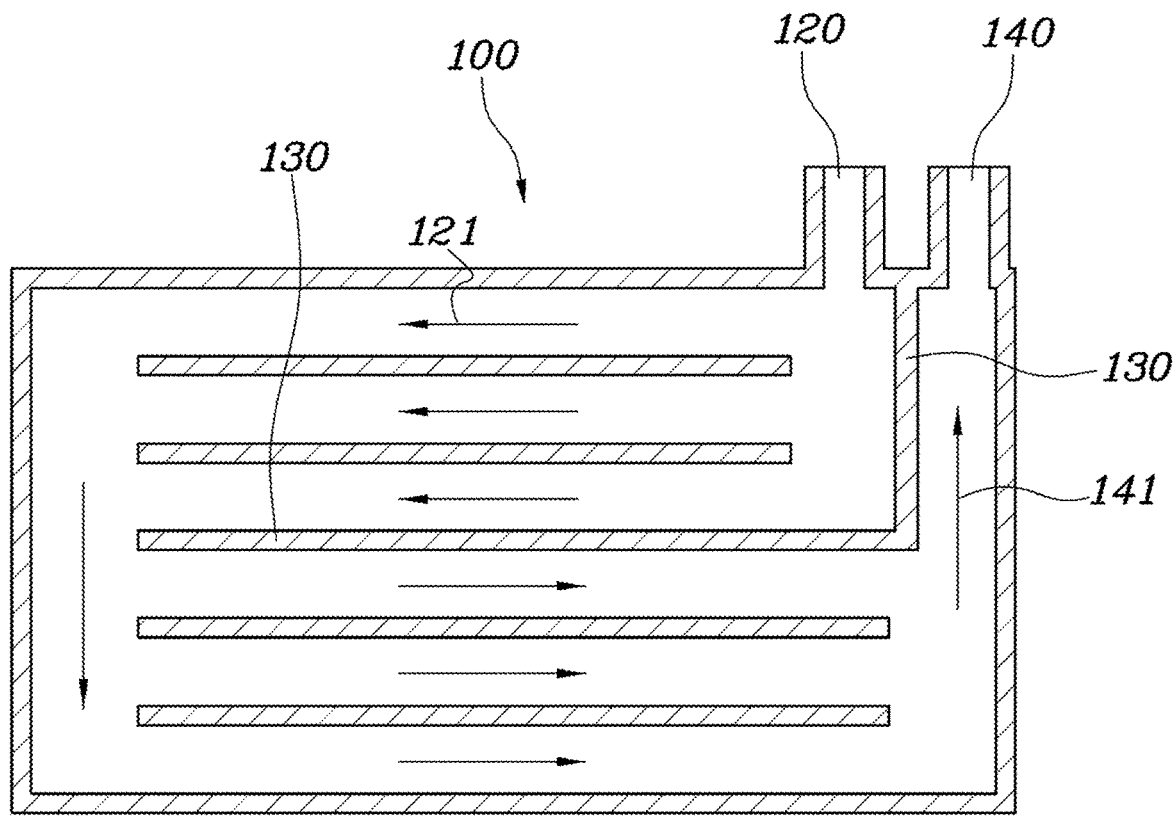
FIG. 4 is a view showing the internal structure of a cooling system for vehicles according to a further exemplary embodiment of the present invention.
Figure 5:
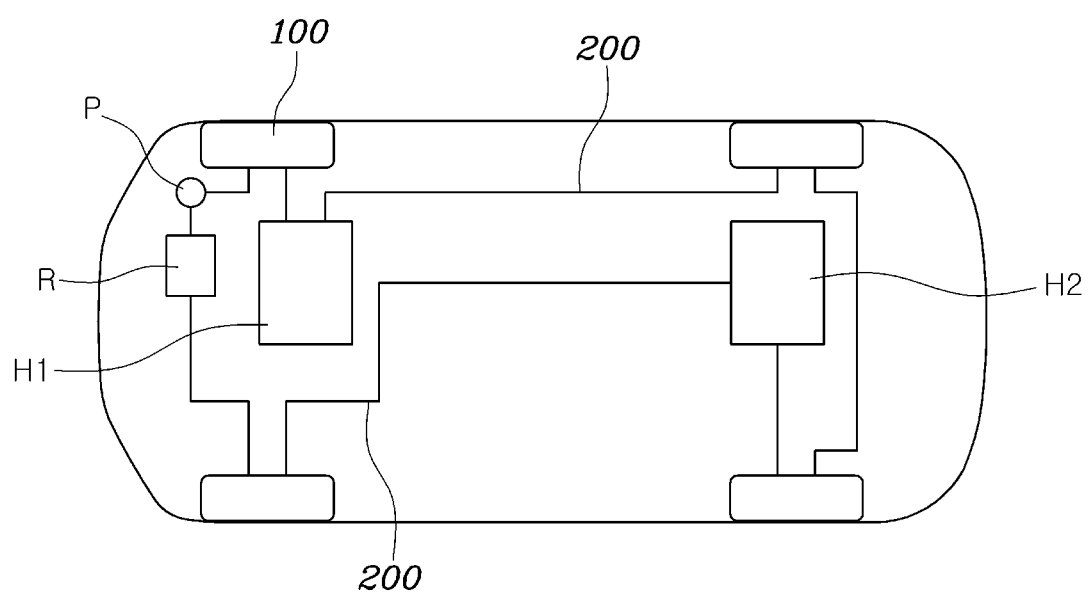
FIG. 5 is a view showing the construction of a vehicle in which four cooling channels of a cooling system according to an exemplary embodiment of the present invention are connected to each other.
Figure 6:
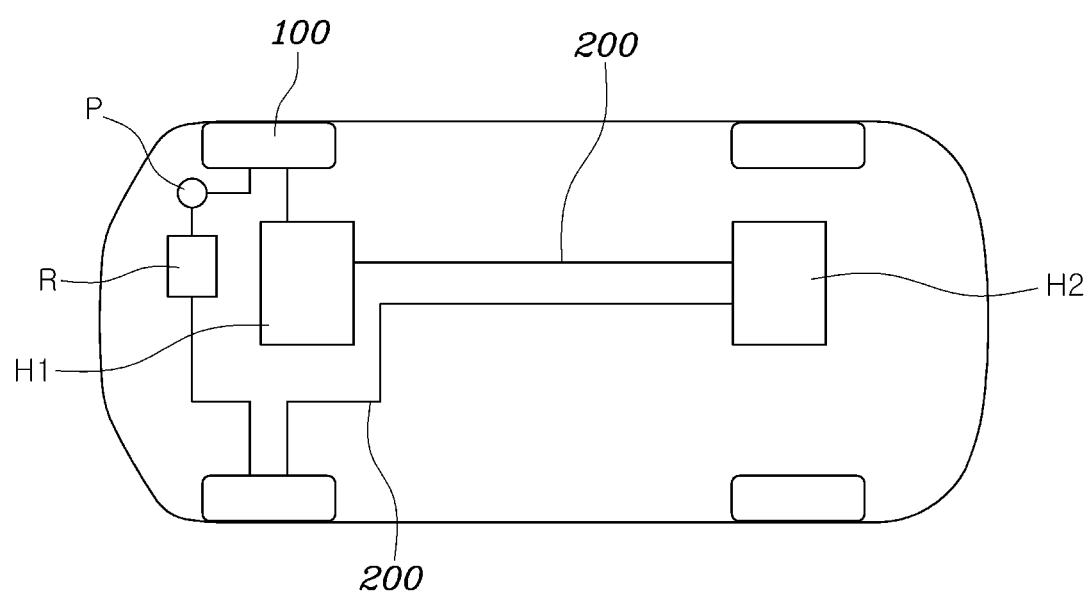
FIG. 6 is a view showing the construction of a vehicle in which two cooling channels of a cooling system according to an exemplary embodiment the present invention are connected to each other.
Figure 7:
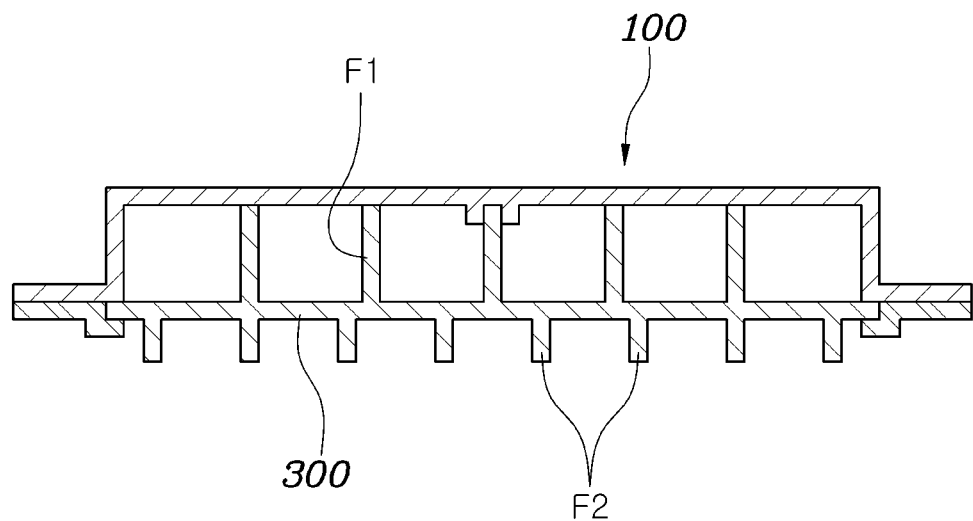
FIG. 7 is a cross-sectional view taken along line B-B in FIG. 1 to show the configuration of a cooling system according to an exemplary embodiment of the present invention.
Figure 8:
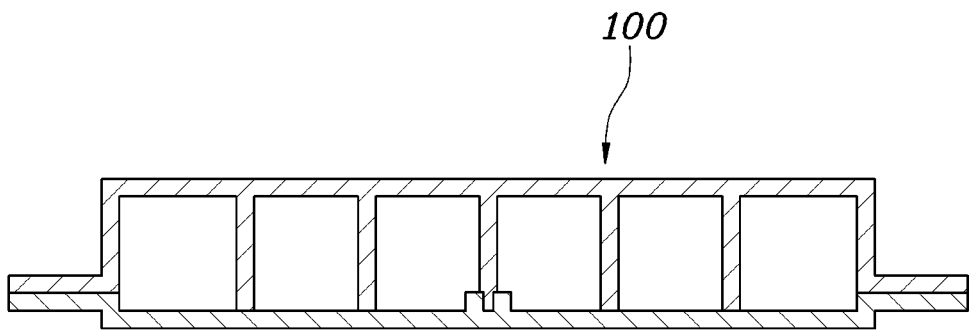
FIG. 8 is a cross-sectional view taken along line B-B in FIG. 1 to show the configuration of a cooling system according to another exemplary embodiment of the present invention.
Figure 9:
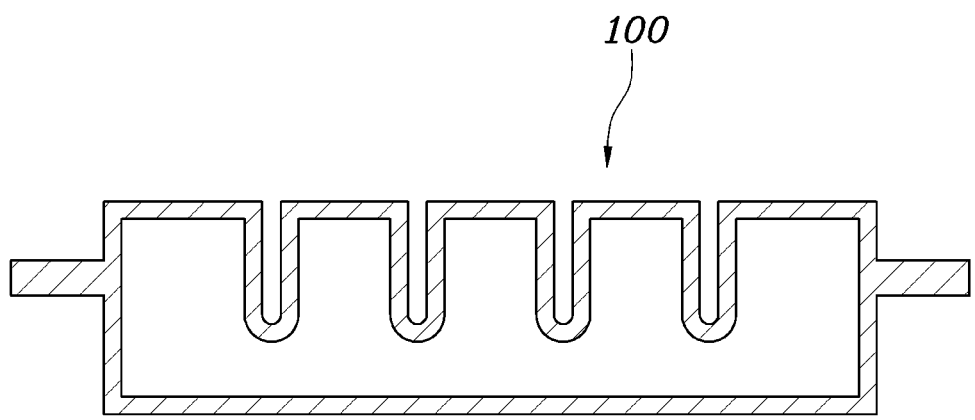
FIG. 9 is a cross-sectional view taken along line B-B in FIG. 1 to show the configuration of a cooling system according to a further exemplary embodiment of the present invention.

FIG. 1 is a view showing a cooling system for vehicles according to an exemplary embodiment of the present invention. FIG. 2 is a view showing the internal structure of the cooling system for vehicles according to an exemplary embodiment of the present invention. FIG. 3 is a view showing the internal structure of a cooling system for vehicles according to another exemplary embodiment of the present invention. FIG. 4 is a view showing the internal structure of a cooling system for vehicles according to a further exemplary embodiment of the present invention. FIG. 5 is a view showing the construction of a vehicle in which four cooling channels of a cooling system according to an exemplary embodiment of the present invention are connected to each other. FIG. 6 is a view showing the construction of a vehicle in which two cooling channels of a cooling system according to an exemplary embodiment of the present invention are connected to each other. FIG. 7 is a cross-sectional view taken along line B-B in FIG. 1 to show the configuration of a cooling system according to an exemplary embodiment of the present invention. FIG. 8 is a cross-sectional view taken along line B-B in FIG. 1 to show the configuration of a cooling system according to another exemplary embodiment of the present invention. FIG. 9 is a cross-sectional view taken along line B-B in FIG. 1 to show the configuration of a cooling system according to a further exemplary embodiment of the present invention.

Heat-emitting parts of a vehicle generally operate under harsh temperature conditions due to the heat generated during the driving of the vehicle and changes in external temperature. Thus, it is necessary to decrease the temperature of the heat-emitting parts using a cooling medium.

As shown in FIGS. 1 to 4, a cooling system for vehicles according to the present invention may include a cooling channel 100, disposed in a wheel housing of a vehicle and that may include an inlet port 120 and an outlet port 140, and a cooling line 200, which connects the inlet port 120 and the outlet port 140 of the cooling channel 100 to a heat-emitting part H of the vehicle to cool the heat-emitting part H using the cooling channel 100. A cooling medium may be introduced into the cooling channel 100 through the inlet port 120, may circulate through the cooling channel 100, and may be discharged through the outlet port 140. One surface of the cooling channel 100 may be exposed toward a wheel of the vehicle to exchange heat with air swirling or circulating in a space formed between the wheel and the wheel housing.

The cooling channel 100 according to the present invention may be disposed in the wheel housing, and the cooling medium may circulate through the cooling channel 100. The cooling medium may be cooled by heat exchange with air swirling or circulating in the space S formed between the wheel W and the wheel housing while the vehicle travels. The cooled cooling medium may thus be reduced in temperature and may be supplied to the heat-emitting part H via the cooling line 200 and may decrease the temperature of the heat-emitting part H.

Many conventional cooling systems for vehicles are configured to decrease the temperature of a cooling medium through heat exchange with air introduced through a radiator grille. However, as shown in FIG. 1, while the vehicle is being driven, external air flows into a radiator grill, and substantial air resistance acts on the front side of the vehicle, as represented by the arrows A.

Since the cooling system according to the present invention is disposed within the wheel housing, a radiator grille on the vehicle may be omitted, and thus the front side of the vehicle may be designed to have a streamlined shape. Accordingly, the front side of the vehicle presents less air resistance (refer to the arrows A in FIG. 1) while the vehicle is being driven, and thus the aerodynamic performance of the vehicle may be improved. In addition, since an LED screen or the like may be installed at a position where a radiator grille was conventionally installed, the vehicle may be manufactured in various designs.

Additionally, a reservoir tank R may be disposed in the cooling line 200. The cooling medium may vary in volume based on changes in the temperature thereof. The reservoir tank R may store the cooling medium to prevent the cooling line 200 from being damaged by changes in the volume of the cooling medium.

FIGS. 2 to 4 are views illustrating the internal structure of the cooling channel 100. As illustrated in FIGS. 2 to 4, the cooling channel 100 may include a cooling medium introduction passage disposed therein and connected to the inlet port 120 and a cooling medium discharge passage connected to the outlet port 140. The cooling medium introduction passage and the cooling medium discharge passage may be connected to each other inside the cooling channel 100. The heated cooling medium may be introduced through the inlet port 120 and may be cooled while passing through the cooling medium introduction passage and the cooling medium discharge passage. The cooled cooling medium may be supplied again to the heat-emitting part H, and may decrease the temperature of the heat-emitting part H through heat exchange therewith.

In particular, the inlet port 120 and the outlet port 140 may be located adjacent to each other. The cooling medium introduction passage and the cooling medium discharge passage may be partitioned from each other by a partition wall 130 in a first internal region formed near the inlet port 120 and the outlet port 140, and may be connected to each other in a second internal region spaced apart from the inlet port 120 and the outlet port 140. Specifically, the inlet port 120 and the outlet port 140 may be disposed at the middle portion of the cooling channel 100, and the cooling medium introduction passage and the cooling medium discharge passage may be partitioned from each other by the partition wall 130 that extends from the inner surface of the middle portion of the cooling channel 100 in the first internal region formed near the inlet port 120 and the outlet port 140.

As illustrated in FIG. 2, the cooling medium introduced through the inlet port 120 flows as represented by the arrows in FIG. 2, and may be discharged through the outlet port 140 to be supplied to the heat-emitting part H. The partition wall 130, formed in the first internal region formed near the inlet port 120 and the outlet port 140, may prevent heat exchange between the cooling medium flowing through the cooling medium introduction passage and the cooling medium flowing through the cooling medium discharge passage. The cooling medium introduced through the inlet port 120 may move to the outlet port 140 via the cooling medium introduction passage and the cooling medium discharge passage, connected to each other in the second internal region of the cooling channel 100.

In addition, as illustrated in FIG. 4, the inlet port 120 and the outlet port 140 may be disposed at the end portion of a first side of the cooling channel 100. The interior of the cooling channel 100 may be partitioned into the cooling medium introduction passage and the cooling medium discharge passage by a partition wall 130. The cooling medium introduction passage and the cooling medium discharge passage may be connected to each other in an internal region formed near the end portion of the opposite side (e.g., a second side) of the cooling channel 100. The cooling medium introduced through the inlet port 120 may flow as represented by the arrows in FIG. 4, and may be discharged through the outlet port 140 to be supplied to the heat-emitting part H. The partition wall 130, by which the cooling medium introduction passage and the cooling medium discharge passage are partitioned from each other, may prevent heat exchange between the cooling medium flowing through the cooling medium introduction passage and the cooling medium flowing through the cooling medium discharge passage.

In addition, as illustrated in FIG. 3, the inlet port 120 and the outlet port 140 may be respectively disposed at the front side and the rear side of the wheel housing in the longitudinal direction of the vehicle. The cooling medium introduction passage and the cooling medium discharge passage may be connected to each other inside the cooling channel 100. In the configuration in which the inlet port 120 and the outlet port 140 are disposed as described above, the cooling medium may flow as represented by the arrows in FIG. 3.

As described above, since the positions of the inlet port 120 and the outlet port 140 of the cooling channel 100 and the internal structure of the cooling channel 100 may be set variously, the internal structure of the vehicle may be also be designed variously. Meanwhile, as illustrated in FIG. 1, the cooling system for vehicles may further include a pump P disposed in the cooling line 200. While the vehicle is being driven, the pump P may be operated (by a controller within the vehicle) to cause the cooling medium to flow. When the vehicle is stopped, the pump P may be stopped to prevent the cooling medium from flowing. While the vehicle is being driven, air swirls or circulates in the space S formed between the wheel and the wheel housing. At this time, the pump P may be operated or driven to cause the cooling medium to flow, by which heat exchange between the air and the cooling medium may be actively realized. On the other hand, when the vehicle is stopped, the pump P may be stopped to thus prevent the cooling medium from flowing, by which energy may be saved.

Meanwhile, as illustrated in FIG. 7, the one surface of the cooling channel 100 that is exposed toward the wheel of the vehicle may be embodied as a heat dissipation plate 300, which is made from a metal material. The heat dissipation plate 300 exchanges heat with the air swirling or circulating in the space S formed between the wheel and the wheel housing. Thus, it may be possible to maximize the efficiency of heat exchange between the cooling medium and the swirling air due to the heat dissipation plate 300, which is made from a metal material having high thermal conductivity.

In addition, as illustrated in FIG. 7, the heat dissipation plate 300 may include a plurality of flanges F1, that protrude from the top surface of the heat dissipation plate 300 toward the interior of the cooling channel. The flanges F1 may be arranged to be spaced apart from each other. The heat exchange area between the cooling medium and the heat dissipation plate 300 may be increased by the flanges F1, by which heat exchange efficiency may also be increased.

As further illustrated in FIG. 7, the heat dissipation plate 300 may include a plurality of heat dissipation fins F2, that protrude from the bottom surface of the heat dissipation plate 300 toward the wheel of the vehicle. The heat dissipation fins F2 may be arranged to be spaced apart from each other. The heat exchange area between the heat dissipation plate 300 and the swirling or circulating air may be increased by the heat dissipation fins F2, by which heat exchange efficiency may also be increased.

As illustrated in FIG. 7, the edge of the heat dissipation plate 300 may be fixedly inserted into a groove formed along the inner peripheral surface of the cooling channel 100. This fixing structure of inserting the heat dissipation plate 300 into the cooling channel 100 may prevent separation of the heat dissipation plate 300 from the cooling channel 100.

As illustrated in FIG. 8, the elements of the cooling channel 100 may be formed through an injection-molding method and may be assembled with each other. In addition, as illustrated in FIG. 9, the cooling channel 100 may be formed to have an integral structure through a blow-molding method. However, the present invention is not limited thereto. The cooling channel 100 may be formed in various other manners by those skilled in the art.

Meanwhile, as illustrated in FIG. 5, a plurality of cooling channels 100 may be provided and thus, each of the cooling channels 100 may be disposed in a respective one of a plurality of wheel housings of the vehicle. The cooling channels 100 may be connected to each other via a single cooling line 200. Particularly, four wheel housings and four cooling channels 100 may be provided, and the heat-emitting part H may include a first part H1 and a second part H2. The cooling medium discharged from the first part H1 may be cooled while passing through two of the four cooling channels 100, and may be introduced into the second part H2. The cooling medium discharged from the second part H2 may be cooled while passing through two remaining cooling channels 100 among the four cooling channels 100.

Accordingly, since the cooling medium exchanges heat with external air at a plurality of places, i.e. at four cooling channels 100, heat exchange efficiency may be improved. Further, as illustrated in FIG. 5, the cooling medium that has passed through the first part H1 may be introduced into the second part H2 via two cooling channels 100 disposed at the rear side of the vehicle. In other words, the first part H1 exchanges heat with the cooling medium that has passed through two cooling channels 100, and the second part H2 exchanges heat with the cooling medium that has passed through the two remaining cooling channels 100. Accordingly, it may be possible to design four-wheel vehicles having high heat exchange efficiency.

In addition, as illustrated in FIG. 6, two wheel housings and two cooling channels 100 may be provided, and the heat-emitting part H may include a first part H1 and a second part H2. The cooling medium discharged from the first part H1 may be introduced into the second part H2, and the cooling medium discharged from the second part H2 may be cooled while passing through the two cooling channels 100. Particularly, the second part H2 may be a component that emits heat at a greater temperature than the first part H1.

In this configuration, although the cooling medium is heated while passing through the first part H1, the cooling medium is capable of cooling the second part H2. Accordingly, it may be possible to design a cooling system capable of maximizing heat exchange efficiency by arranging heat-emitting parts, which emit heat at different temperatures from each other, in the manner described above.

As is apparent from the above description, a cooling system for vehicles according to the present invention may cool a cooling medium using heat exchange between air, swirling or circulating between a wheel and a wheel housing, and the cooling medium. Particularly, since the cooling system uses air swirling between a wheel and a wheel housing, a conventional radiator grille may be omitted. As a result, the vehicle has less air resistance while traveling, and consequently, the aerodynamic performance of the vehicle may be improved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling system for vehicles, comprising:
   at least one cooling channel disposed in at least one wheel housing of a vehicle, the cooling channel including an inlet port and an outlet port;
   a cooling line that connects the inlet port and the outlet port of the cooling channel to a heat-emitting part of the vehicle to cool the heat-emitting part using the cooling channel; and
   a reservoir tank configured to store a cooling medium and disposed in the cooling line,
   wherein the cooling medium is introduced into the cooling channel through the inlet port, circulates through the cooling channel, and is discharged through the outlet port, and
   wherein one surface of the cooling channel is exposed toward a wheel of the vehicle to exchange heat with air circulating in a space formed between the wheel and the wheel housing.

2. The cooling system according to claim 1, wherein the cooling channel includes a cooling medium introduction passage connected to the inlet port and a cooling medium discharge passage connected to the outlet port, and the cooling medium introduction passage and the cooling medium discharge passage are connected to each other inside the cooling channel.

3. The cooling system according to claim 2, wherein the inlet port and the outlet port are disposed adjacent to each other, and the cooling medium introduction passage and the cooling medium discharge passage are partitioned from each other by a partition wall in a first internal region formed near the inlet port and the outlet port, and are connected to each other in a second internal region spaced apart from the inlet port and the outlet port.

4. The cooling system according to claim 3, wherein the inlet port and the outlet port are disposed at a middle portion of the cooling channel, and the cooling medium introduction passage and the cooling medium discharge passage are partitioned from each other by a partition wall that extends from an inner surface of the middle portion of the cooling channel in the first internal region formed proximate to the inlet port and the outlet port.

5. The cooling system according to claim 3, wherein the inlet port and the outlet port are disposed at an end portion of a first side of the cooling channel, an interior of the cooling channel is partitioned into the cooling medium introduction passage and the cooling medium discharge passage by a partition wall, and the cooling medium introduction passage and the cooling medium discharge passage are connected to each other in an internal region formed near an end portion of a second side of the cooling channel.

6. The cooling system according to claim 2, wherein the inlet port and the outlet port are respectively disposed at a front side and a rear side of the wheel housing in a longitudinal direction of the vehicle, and the cooling medium introduction passage and the cooling medium discharge passage are connected to each other inside the cooling channel.

7. The cooling system according to claim 1, further comprising:
   a pump disposed in the cooling line,
   wherein, while the vehicle is being driven, the pump is operated to cause the cooling medium to flow, and
   wherein when the vehicle is stopped, the pump is stopped to prevent the cooling medium from flowing.

8. The cooling system according to claim 1, wherein the one surface of the cooling channel that is exposed toward the wheel of the vehicle is a heat dissipation plate made from a metal material.

9. The cooling system according to claim 8, wherein the heat dissipation plate includes a plurality of flanges that protrude from a top surface thereof toward an interior of the cooling channel, wherein the flanges are arranged to be spaced apart from each other.

10. The cooling system according to claim 8, wherein the heat dissipation plate includes a plurality of heat dissipation fins that protrude from a bottom surface thereof toward the wheel of the vehicle, and the heat dissipation fins are arranged to be spaced apart from each other.

11. The cooling system according to claim 8, wherein the heat dissipation plate is fixedly inserted at an edge thereof into a groove formed along an inner peripheral surface of the cooling channel.

12. The cooling system according to claim 1, wherein the at least one cooling channel includes a plurality of cooling channels, the at least one wheel housing includes a plurality of wheel housings, each of the cooling channels is disposed in a respective one of the wheel housings, and the cooling channels are connected to each other via the cooling line.

13. The cooling system according to claim 12, wherein the at least one cooling channel includes four cooling channels, the at least one wheel housing includes four wheel housings, the heat-emitting part includes a first part and a second part, the cooling medium discharged from the first part is cooled while passing through two of the four cooling channels, and is introduced into the second part, and the cooling medium discharged from the second part is cooled while passing through two remaining ones among the four cooling channels.

14. The cooling system according to claim 12, wherein the at least one cooling channel includes two cooling channels, the at least one wheel housing includes two wheel housings, the heat-emitting part includes a first part and a second part, the second part emitting heat at a greater temperature than the first part, the cooling medium discharged from the first part is introduced into the second part, and the cooling medium discharged from the second part is cooled while passing through the two cooling channels.

* * * * *